(12) United States Patent
Wiseman

(10) Patent No.: US 7,365,518 B2
(45) Date of Patent: Apr. 29, 2008

(54) ION ENGINE POWER SUPPLY

(75) Inventor: Steven L. Wiseman, Redondo Beach, CA (US)

(73) Assignee: L-3 Communications Electron Technologies, Inc., Torrance, CA (US)

( * ) Notice: Subject to any disclaimer, the term of this patent is extended or adjusted under 35 U.S.C. 154(b) by 156 days.

(21) Appl. No.: 10/962,091

(22) Filed: Oct. 7, 2004

(65) Prior Publication Data

US 2006/0076935 A1 Apr. 13, 2006

(51) Int. Cl.
*H02P 9/00* (2006.01)
*H02P 9/02* (2006.01)
*H02P 9/11* (2006.01)
*H02P 9/30* (2006.01)
*H02J 7/16* (2006.01)

(52) U.S. Cl. .......................................... 322/28; 322/20
(58) Field of Classification Search ................ 322/20, 322/28
See application file for complete search history.

(56) References Cited

U.S. PATENT DOCUMENTS

| | | | | |
|---|---|---|---|---|
| 2,899,623 A * | 8/1959 | Medlar | ........................ | 320/126 |
| 2,911,582 A * | 11/1959 | Kellogg | ........................ | 363/12 |
| 3,710,226 A * | 1/1973 | Seike | ........................ | 320/123 |
| 4,045,718 A * | 8/1977 | Gray | ........................ | 320/123 |
| 4,197,492 A * | 4/1980 | Sato et al. | ........................ | 322/28 |
| 4,239,978 A * | 12/1980 | Kofink | ........................ | 307/17 |
| 4,314,194 A * | 2/1982 | Severing | ........................ | 322/89 |
| 4,336,485 A * | 6/1982 | Stroud | ........................ | 320/126 |
| 4,347,473 A * | 8/1982 | Stroud | ........................ | 320/126 |
| 4,419,618 A * | 12/1983 | Gretsch | ........................ | 322/7 |
| 4,454,464 A * | 6/1984 | Stroud | ........................ | 322/28 |
| 4,456,870 A * | 6/1984 | Rodari | ........................ | 322/29 |
| 4,768,002 A * | 8/1988 | Cronin | ........................ | 333/177 |
| 4,835,668 A * | 5/1989 | Palm et al. | ........................ | 363/21.04 |
| 4,999,563 A * | 3/1991 | Suzuki | ........................ | 322/90 |
| 5,506,492 A * | 4/1996 | Harris | ........................ | 322/28 |
| 5,859,527 A * | 1/1999 | Cook | ........................ | 323/298 |
| 6,201,359 B1 | 3/2001 | Raets | ........................ | 315/382.1 |
| 7,095,214 B2 * | 8/2006 | O'Gorman et al. | ........................ | 322/28 |
| 7,109,687 B2 * | 9/2006 | Kashihara | ........................ | 322/24 |
| 7,157,885 B2 * | 1/2007 | Nakagawa et al. | ........................ | 322/28 |
| 7,221,127 B2 * | 5/2007 | Masson et al. | ........................ | 322/28 |
| 7,230,399 B2 * | 6/2007 | Kuribayashi et al. | ........................ | 318/434 |
| 7,253,590 B2 * | 8/2007 | Suzuki et al. | ........................ | 322/20 |
| 7,269,940 B2 * | 9/2007 | Wiseman | ........................ | 60/202 |
| 7,271,620 B2 * | 9/2007 | Gallo et al. | ........................ | 326/87 |
| 7,292,003 B1 * | 11/2007 | Baker et al. | ........................ | 318/717 |
| 7,307,404 B2 * | 12/2007 | Mellor et al. | ........................ | 322/46 |
| 2007/0216339 A1* | 9/2007 | Yoshimoto et al. | ........................ | 318/800 |

* cited by examiner

*Primary Examiner*—Darren Schuberg
*Assistant Examiner*—Pedro J. Cuevas
(74) *Attorney, Agent, or Firm*—Proskauer Rose LLP

(57) ABSTRACT

A power supply for an ion engine comprises a multiphase alternator and a power converter comprising a voltage multiplier coupled to each phase of the alternator. Each voltage multiplier comprises one or more staged voltage doublers. The alternator phases may be coupled to each other in a Y configuration such that no common return line is required, and each phase of the alternator provides equal amounts of constant power in a balanced, sequential flow. The converter corrects for the alternator's inherent internal reactance, thereby minimizing the required output of the alternator and reducing the overall power required of the system. A controllable impedance can be inserted into a low voltage portion of the multiplier for selectably varying the output voltage and power of the supply.

20 Claims, 3 Drawing Sheets

ION ENGINE POWER SUPPLY

BACKGROUND OF THE INVENTION

1. Field of the Invention

This invention relates to electrical power production and conversion in general, and in particular, to a power supply useful for powering an ion thruster engine.

2. Related Art

Electrostatic ion thruster engines for spacecraft require a source of high voltage DC power to provide an accelerating voltage for the propellant ions created within the engine. These ions are accelerated to a high velocity by the high voltage and then expelled from the engine, thereby providing a reactive thrust to the vehicle to which the engine is mounted. For some space vehicles incorporating ion thruster engines, it is therefore typically necessary to provide a power converter for converting power from a relatively low voltage, multiphase AC source, such as a multiphase alternator, to a relatively high voltage DC output to the engine in an efficient, reliable way. Additionally, it is desirable for the electronic components of the converter to be capable of operating reliably in the high radiation environment of space.

An AC-to-DC converter is typically employed as a so-called "front-end" power supply in many electronic power systems. Various topologies are known for converting the AC power output of a generator or an alternator, to DC power, and these typically involve one or more stages of rectification, and, where the final DC voltage required is greater than the peak voltage supplied by the AC source, one or more stages of transformation, typically effected with either transformers and/or DC-to-DC converters.

In the case of spacecraft equipped with ion thruster engines, the AC source can be a multiphase alternator driven by a nuclear-reactor-powered turbine, and is typically located remotely from the ion engine itself. This requires conveying the alternator power to the engine over relatively long distances, e.g., 30-50 ft. Thus, while it is theoretically possible to provide an alternator having an output voltage that is the same or greater than the high voltage required by the engine, e.g., 4000-5000 VDC, this is impracticable because of the shielding problems encountered, such as arcing and insulator degradation, in conveying such high voltages over such relatively long distances. Therefore, as a practical upper limit, the maximum voltage that can be reliably conveyed over such distances without encountering shielding problems is about 400-500 V RMS. It is therefore preferable to confine the high voltage portions of the power converter, including the voltage transformation portions, to locations that are relatively close to the engine and thereby minimize high voltage shielding problems.

In addition to the foregoing considerations, it will be understood that even low current versions of transformers capable of producing high voltages must be large and heavy, especially if used in the hard vacuum of space, because of the power handling and maximum flux capability required of these transformers. On the other hand, DC-to-DC converters that rely on "choppers," i.e., active devices, such as transistors, can be complex, and are particularly susceptible to radiation damage in the space environment.

Accordingly, a long felt but as yet unsatisfied need exists for a simple, efficient, reliable, and light weight power converter that is capable of coupling the power from the output of a lower voltage multiphase AC alternator to a source of higher voltage DC power in a form suitable for powering an electrostatic ion thruster engine. Additionally, the desired converter should have a high power factor in the transmission of power to the engine, utilize only components having a high tolerance to space radiation environments, and have a power and output voltage that can be easily and precisely controlled.

BRIEF SUMMARY OF THE INVENTION

In accordance with the present invention, a power supply for an ion thruster engine is provided that comprises a multiphase alternator and an AC-to-DC power converter that efficiently converts the power from the output of the alternator to a form of high voltage DC power that is suitable for powering the ion engine. The power converter is reliable, light in weight, has a substantially higher power factor than prior art power converters incorporating transformers or DC-to-DC converters, and utilizes only components having a high tolerance to radiation. The output voltage and power of the converter may be easily and precisely controlled by controlling the power transfer from the low voltage AC source to the high voltage DC output.

In one exemplary embodiment, the AC power source comprises a multiphase alternator, and the power converter comprises voltage multipliers having input terminals coupled to respective ones of the phases of the alternator, and output terminals coupled to each other and to the power input terminal of the ion engine. The alternator phases may be coupled together in either a grounded or ungrounded Y configuration, so that no common return line is required between the alternator and the converter, and such that each phase of the alternator provides equal amounts of power to the ion engine in a balanced, sequential flow.

Each of the multipliers of the power converter comprises a plurality of identical diode and-capacitor "voltage doubler" circuits, or "stages" coupled in cascade with each other such that that the no-load DC output voltage of each multiplier is nominally 2n times the peak voltage of the respective alternator phase to which it is coupled, where n is the number of stages in the multiplier, and such that the DC output voltage of each stage of the multiplier is nominally twice that of the preceding stage.

The power converter functions to correct for the alternator's inherent internal reactance and thereby produces a high power factor, thus minimizing the required power output of the alternator and reducing the overall power required of the reactor and alternator. Improving the power factor from the alternator to the power converter also reduces the power handling requirements for the interconnections between the alternator and the power converter.

A better understanding of the above and many other features and advantages of the invention may be obtained from a consideration of the detailed description thereof below, particularly if such consideration is made in conjunction with the several views of the appended drawings.

DETAILED DESCRIPTION OF THE INVENTION

Figure 1:
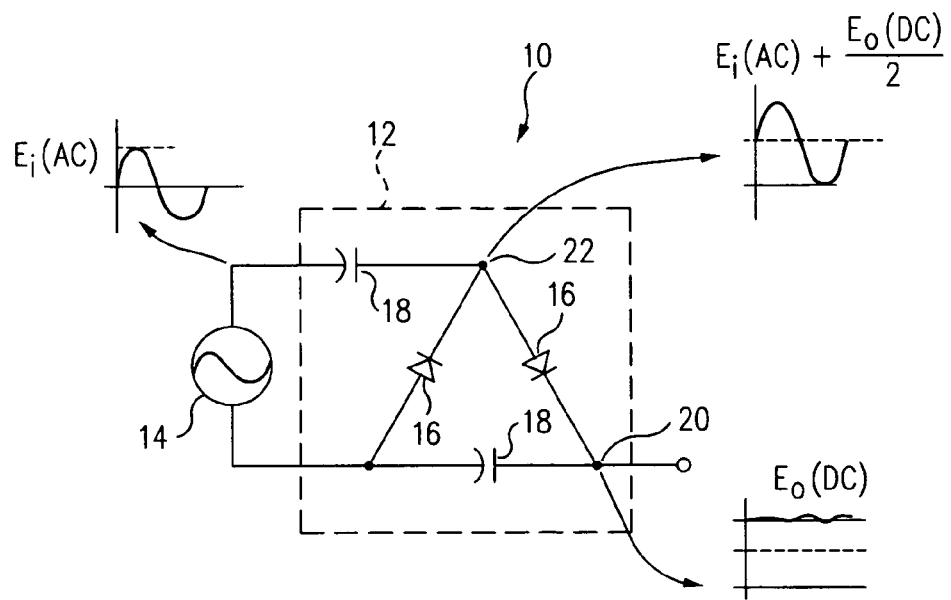
FIG. 1 is a schematic diagram of a power supply for an ion engine in accordance with an exemplary embodiment of the present invention, showing a single stage voltage multiplier coupled to the output of a phase of an alternator.

FIG. 1 is a schematic diagram of a power supply 10 for an ion thruster engine (not illustrated) in accordance with one exemplary embodiment of the present invention. The power supply comprises a single stage voltage multiplier 12 coupled to the output of one armature winding, or phase, of an AC alternator 14. In the particular embodiment illustrated in FIG. 1, the alternator comprises a single-phase alternator having a sinusoidal peak output voltage of $E_i$, although as discussed below, the present invention is not limited to single phase alternators, but can be advantageously extended to multiphase alternators, such as three-phase, six-phase, or other known types of multiphase alternators, in the manner described below.

As will be recognized by those of skill in the art, the single stage multiplier 12 comprises a so-called "voltage doubler" circuit. If the capacitors of the circuit are fully charged from previous cycles of the alternator, a DC voltage $E_o$, having a relatively small amount of ripple, will be produced at the circuit node 20 of FIG. 1 that is twice the peak input voltage $E_i$ of the alternator, and an AC voltage will be produced at the node 22 of the circuit that is equal to the input AC voltage $E_i$, superimposed on a DC voltage that is equal to the peak voltage $E_i$ of the alternator. Advantageously, the output of the voltage doubler circuit 12 illustrated in FIG. 2 can be chained, or coupled in stages, with the input of another voltage doubler circuit to form a "voltage multiplier" 24, sometimes referred to as a Cockcroft-Walton voltage multiplier, in which the total DC output voltage of the multiplier is nominally 2n times the peak AC input voltage, where n is the number of voltage doublers, or stages, in the multiplier, and in which the DC output voltage of each stage of the multiplier is nominally twice that of the preceding stage, as illustrated in FIG. 2.

Figure 2:
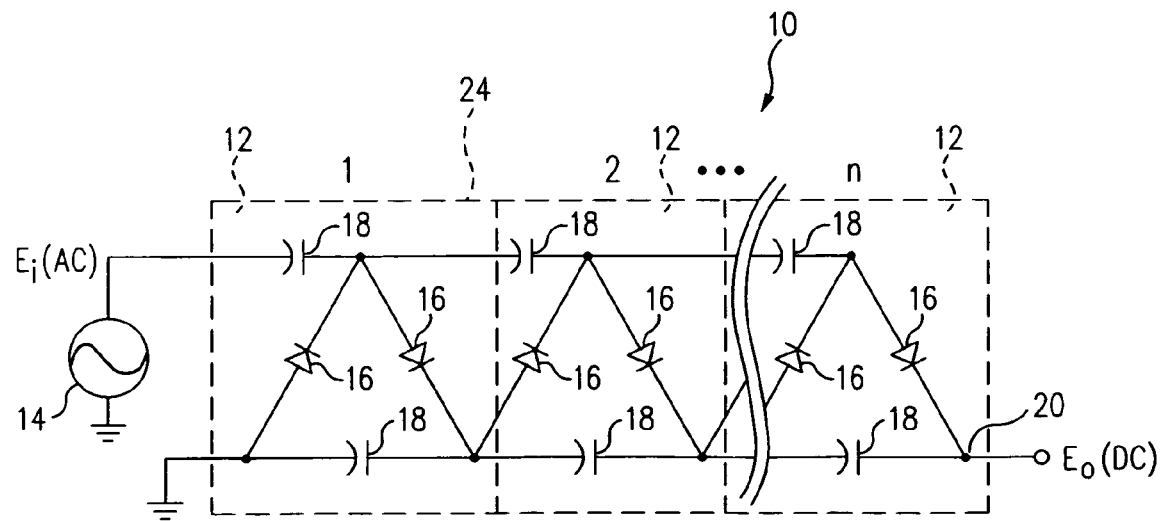
FIG. 2 is a schematic diagram of another exemplary power supply comprising a multiple stage voltage multiplier coupled to the phase output of an alternator.

In FIG. 2, an exemplary n-stage voltage multiplier, or power converter 24, is shown coupled to the output of the phase of a one phase AC alternator 14, in an arrangement similar to that shown in FIG. 1, except that the voltage multiplier includes n stages of voltage doubling. As discussed above, the DC output voltage $E_o$ of the converter is nominally 2n times the peak AC input voltage $E_o$ of the alternator phase. Thus, the power converter 24 enables both transformation and rectification of a relatively low AC voltage into a relatively high DC voltage without the use of transformers, DC-to-DC converters, or the complex switching circuitry of choppers.

Theoretically, any number n of doubler stages 12 can be added to the power converter 24 to arrive at the maximum DC voltage desired. However, as a practical matter, the current drawn by a load coupled to the output of the converter acts to reduce the voltage produced by each of the stages. Thus, a greater number n of stages will typically be required in the power converter 24 to produce a given output voltage $E_o$ than is given by the no-load relationship, $n = E_o / 2E_i$. For example, in one particular exemplary embodiment of a power supply incorporating a multiphase AC alternator producing 400 VAC RMS per phase, a power converter incorporating 6 stages of voltage doubling is capable of supplying 4000 VDC to a load having a current demand of 6 Amps.

Figure 5:
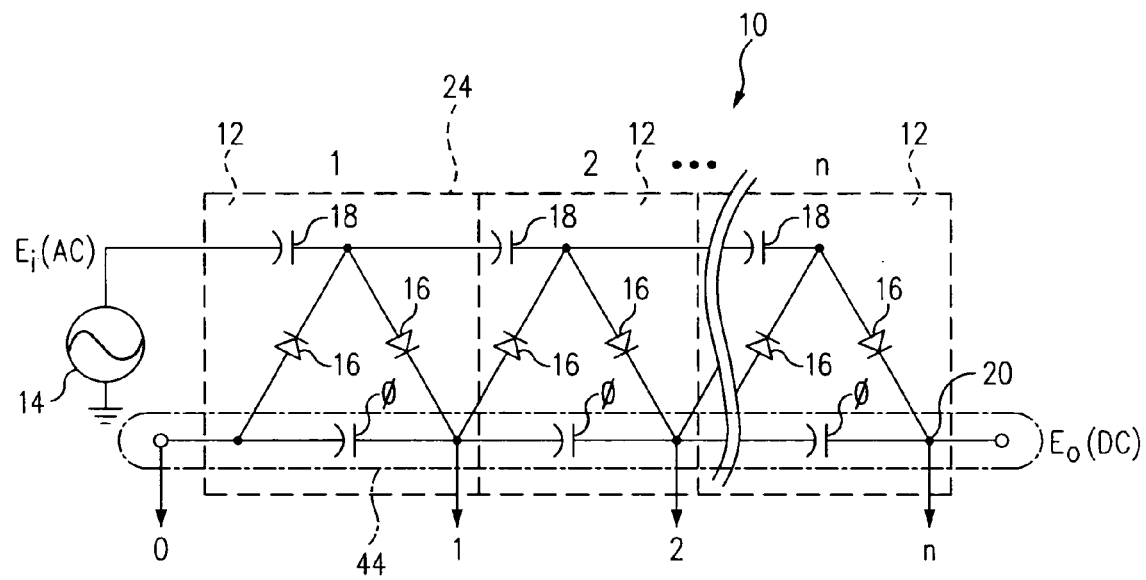
FIG. 5 is a schematic diagram of power supply for an ion engine in accordance with another exemplary embodiment of the present invention, showing the interconnection between the multiplier stages and a common connection for all multiplier stages of the supply; and, FIG. 6 is a schematic diagram of a power supply for an ion engine in accordance with another exemplary embodiment of the present invention, showing the interconnection between the multiplier stages and placement of controllable impedances for selectably controlling the output voltage of the multipliers.

FIG. 5 is a schematic diagram of a power supply 10 in accordance with one exemplary embodiment of the present invention, showing the interconnection between the stages 12 of the multiplier 24 and the common connection, shown encircled by the phantom line 44, for all of the multiplier stages in the supply. Thus, for power supplies having more than one multiplier, such as in the multiphase power supply described below, each of the stage nodes labeled 0, 1, ... n are coupled in common with the correspondingly numbered nodes of the stages of the other multipliers (not illustrated) in the supply. Thus, as illustrated in the figure, a common string of capacitors φ coupled in series forms a portion of each multiplier. This common capacitor stage reduces the overall multiplier capacitance required for the supply.

Figure 6:
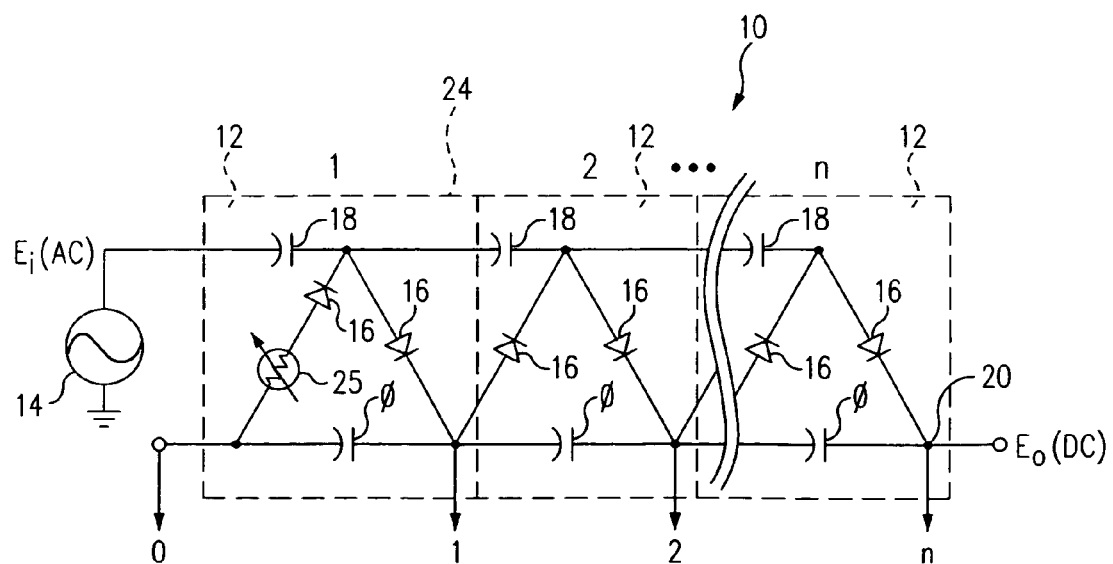

Referring to FIG. 6, the output voltage and power of the power supply 10 can be easily and precisely controlled by controlling the power transfer from the output of the alternator 14 to the output of the power converter 24. As illustrated in FIG. 6, this can be effected by, for example, a controllable impedance 25 placed within the multiplier, preferably in one of the lower voltage stages of the multiplier, e.g., stage 1, as illustrated. Varying this impedance enables the output voltage of the multiplier to be controlled precisely. The controllable impedance 25 can be either passive (e.g., a variable resistance), or active (e.g., an active on/off switch).

As those of skill in the art will appreciate, one of the many advantages of the power supply 10 of the present invention over prior art power supplies relates to its incorporation of capacitors 18 in each of the stages 12 of the voltage multipliers 24, which have a "leading" type of power factor. On the other hand, the coils or armature windings of the alternator 14 constitute inductors, which have a "lagging" type of power factor. Thus, one of the advantages of the power converter 24 of the present invention is that the capacitors cooperate with the armature windings to correct for the alternator's inherent internal lagging current, thereby minimizing the required power output of the alternator, and thus, reducing the overall power required of the system. This results in an alternator having a substantially high power factor, without resorting to complex, lossy "coupling networks" designed to achieve the same result. An additional advantage of the power converter is its incorporation of only rectifier diodes 16 and capacitors, both of which are inherently radiation-resistant.

While the foregoing exemplary embodiments of power supplies 10 are shown and described in the form of a single multiplier 12 or 24 coupled to the phase of a single phase alternator 14, it should be understood that the invention has advantageous application to systems in which the AC source of the system is a balanced, multiphase alternator of a known type, in which the voltages and currents in the respective phases are respectively equal but offset from one another by constant, equal phase angles. In such an application, the power converter of the supply comprises a plurality of voltage multipliers, each having a respective input terminal coupled to a respective one of the phases of the alternator, output terminals coupled commonly to each other and to the power input terminal of the ion engine, and a common capacitor stage, as discussed above.

Figure 3:
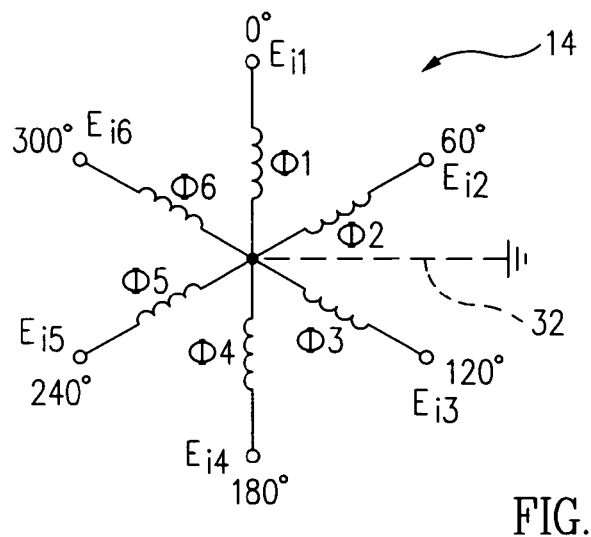
FIG. 3 is a schematic diagram of the armature windings, or phases, of a balanced, six-phase alternator in which the phases are interconnected in a Y configuration.

A six-phase alternator 14 of a type having advantageous application to power supplies for ion thruster engines in accordance with the present invention is illustrated schematically in FIG. 3. Multiphase alternators of the type illustrated are indicated in numerous applications where there is a need to reduce peak voltages and currents in a system that produces the same amount of power. Additionally, because more space is useable in the armature of a multiphase alternator for windings, a multiphase alternator can be made physically smaller than a single-phase alternator of the same rating, a distinct advantage for space applications.

As may be seen in the figure, the six armature windings, or phases, $\Phi 1$-$\Phi 6$ of the alternator 14 are displaced 60° from each other, both mechanically and electrically, and are shown interconnected in a conventional Y configuration such that the sinusoidally alternating line-to neutral, or phase, voltages $E_{ij}$ and currents produced by each phase are identical and spaced apart by 60° in time. An optional neutral conductor 32 is shown as a dashed line to represent its redundant nature in a balanced system, such as in the ion engine power supply 10 of the present invention described below.

Figure 4:
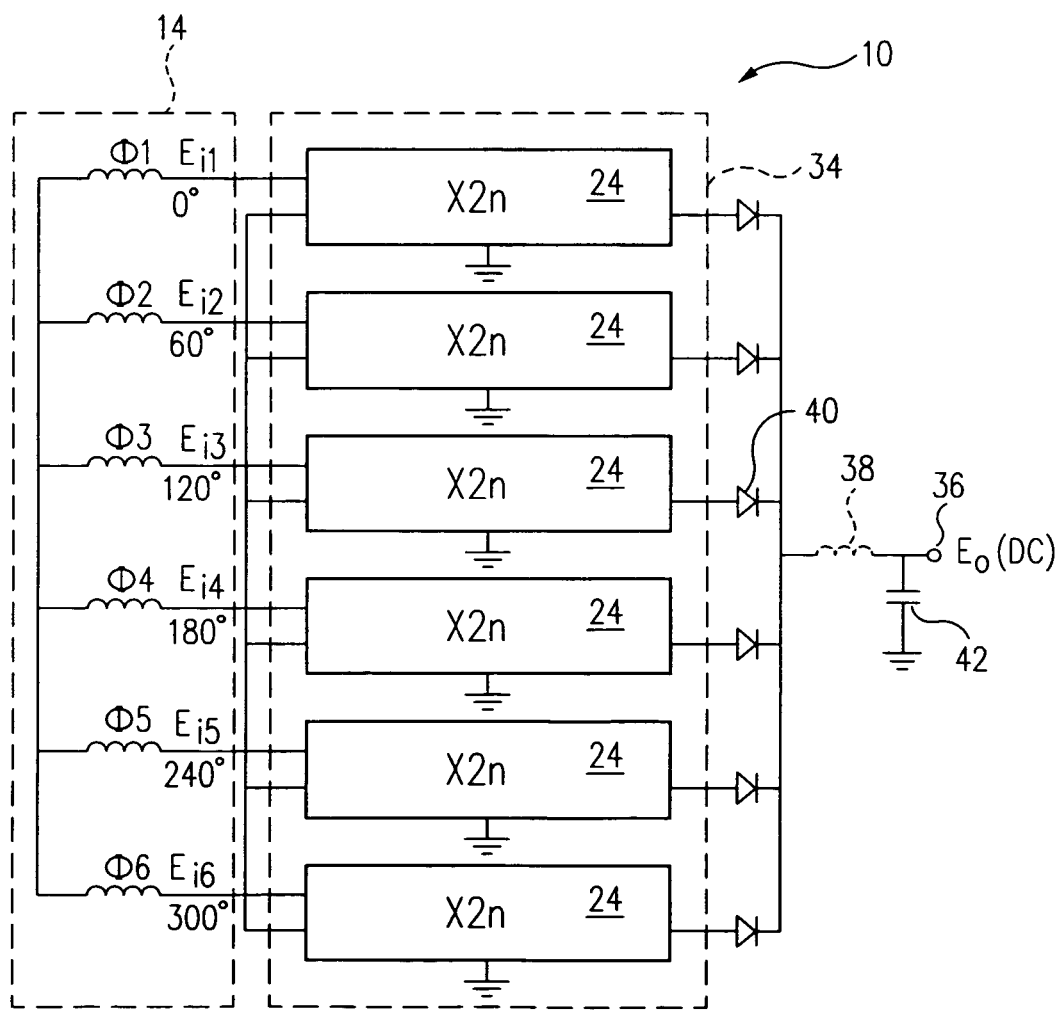
FIG. 4 is a schematic diagram of a power supply for an ion engine in accordance with another exemplary embodiment of the present invention in which six, n-stage voltage multipliers are coupled to respective ones of the phases of the alternator of FIG. 3.

A power supply 10 incorporating the exemplary six phase alternator 14 of FIG. 3 in accordance with the present invention is illustrated in the schematic diagram of FIG. 4. The power converter 34 of the supply comprises a plurality of identical n-stage voltage multipliers 24, each having an input terminal coupled to a respective one of the output terminals of the phases $\Phi$ of the alternator, output terminals coupled commonly to each other and to a power input terminal 36 of the ion engine (not illustrated), and a common capacitor stage, as discussed above. The voltage multipliers are coupled to the respective phase of the alternator such that no common return line 32 (FIG. 3) is required between the alternator and the converter, in a known fashion. As above, the nominal, i.e., no-load, DC output voltage $E_o$ of the power supply is 2n times the peak phase voltages $E_{ij}$ of the alternator, where n is the number of stages in each multiplier. In the embodiment illustrated in FIG. 4, an optional filter inductor 38 has been coupled in series in a common leg of the power converter as a "surge suppressor," i.e., to reduce the peak currents conducted in the rectifier stages of the respective multipliers 24 during power surges of the load. Also shown in the drawing are rectifying diodes 40 placed on the output of each multiplier stage to cause the output current to flow in only one direction. Additionally, a filter capacitor 42 can be added to the power converter's output to reduce the DC ripple produced by the converter, if desired.

As will by now be evident to persons of skill in this art, many modifications, substitutions and variations can be made in and to the materials, components, configurations and methods of implementation of the ion engine power supply 10 of the present invention without departing from its spirit and scope. Accordingly, the scope of the present invention should not be limited to the particular embodiments illustrated and described herein, as they are merely exemplary in nature, but rather, should be fully commensurate with that of the claims appended hereafter and their functional equivalents.

What is claimed is:

1. A power supply, comprising:
   an alternator having a plurality of phases, each phase having an output terminal;
   a plurality of voltage multipliers having a plurality of stage nodes, each voltage multiplier having an input terminal coupled to a respective output terminal of the respective alternator phase, and an output terminal coupled to the output terminals of the other voltage multipliers; and
   a common capacitance stage formed from coupling the respective stage nodes of each voltage multiplier together.

2. The power supply of claim 1, wherein the phases of the alternator are coupled to each other in a Y configuration.

3. The power supply of claim 1, wherein each of the voltage multipliers comprises one or more voltage doubler circuits coupled to each other in stages.

4. The power supply of claim 3, wherein each of the voltage doubler circuits comprises a bridge having a pair of series-coupled diodes coupled in parallel with a pair of series-coupled capacitors.

5. The power supply of claim 1, further comprising a variable impedance coupled into a leg of each of the voltage multipliers for selectably varying the output voltage and power of the power supply.

6. The power supply of claim 5, wherein the variable impedance comprises a variable resistor or a switch.

7. The power supply of claim 1, further comprising a filter inductor coupled in series with the output terminals of the multipliers.

8. The power supply of claim 1, further comprising a rectifier diode coupled in series with the output terminals of each of the multipliers.

9. The power supply of claim 1, wherein the common capacitor stage reduces the overall multiplier capacitance required for the power supply.

10. The power supply of claim 1, wherein the plurality of voltage multipliers are coupled to the respective alternator phase such that no common return line exists between the alternator and the voltage multipliers.

11. A method of providing high voltage DC power to an ion thruster engine, the method comprising:
    providing an alternator having a plurality of phases, each phase having an output terminal;
    coupling input terminals of a plurality of voltage multipliers to respective output terminal of the respective alternator phase, the voltage multipliers having a plurality of stage nodes;
    coupling an output terminal of the voltage multipliers to each other and to an input terminal of the ion engine; and
    coupling the respective stage nodes of each voltage multiplier together to form a common capacitance stage.

12. The method of claim 11, further comprising coupling the phases of the alternator to each other in a Y configuration.

13. The method of claim 11, wherein each of the voltage multipliers comprises one or more voltage doubler circuits coupled to each other in stages.

14. The method of claim 13, wherein each of the voltage doubler circuits comprise a bridge having a pair of series-coupled diodes coupled in parallel with a pair of series-coupled capacitors.

15. The method of claim 11, further comprising coupling a variable impedance into a leg of each of the voltage multipliers for selectably varying the output voltage and power of the power supply.

16. The method of claim 15, wherein the variable impedance comprises a variable resistor or a switch.

17. The method of claim 11, further comprising coupling a filter inductor in series between the output terminal of the multiplier and the input terminal of the ion thruster engine.

18. The method of claim 11, further comprising coupling a rectifier diode in series with the output terminals of each of the multipliers.

19. The method of claim 11, wherein the common capacitor stage reduces the overall multiplier capacitance required for the power supply.

20. The method of claim 11, further comprising coupling input terminals of the plurality of voltage multipliers to respective of output terminal of the respective alternator phase such that no common return line exists between the alternator and the voltage multipliers.

* * * * *